(12) United States Patent
Romansky et al.

(10) Patent No.: US 10,484,351 B2
(45) Date of Patent: Nov. 19, 2019

(54) SYSTEM AND METHOD FOR CERTIFICATE SELECTION IN VEHICLE-TO-VEHICLE APPLICATIONS TO ENHANCE PRIVACY

(71) Applicant: TrustPoint Innovation Technologies, Ltd., Waterloo (CA)

(72) Inventors: Brian M. Romansky, Monroe, CT (US); Constantine Grantcharov, Waterloo (CA); Nevine Maurice Nassif Ebeid, Waterloo (CA)

(73) Assignee: ETAS Embedded Systems Canada Inc., Waterloo (CA)

( * ) Notice: Subject to any disclaimer, the term of this patent is extended or adjusted under 35 U.S.C. 154(b) by 297 days.

(21) Appl. No.: 15/409,840

(22) Filed: Jan. 19, 2017

(65) Prior Publication Data
US 2017/0222990 A1  Aug. 3, 2017

Related U.S. Application Data

(60) Provisional application No. 62/288,010, filed on Jan. 28, 2016.

(51) Int. Cl.
| | |
|---|---|
| *H04L 29/06* | (2006.01) |
| *H04L 29/08* | (2006.01) |
| *H04W 12/04* | (2009.01) |
| *H04L 9/14* | (2006.01) |
| *H04L 9/32* | (2006.01) |
| *H04W 84/00* | (2009.01) |
| *H04W 64/00* | (2009.01) |
| *H04W 4/04* | (2009.01) |

(52) U.S. Cl.
CPC ............ *H04L 63/06* (2013.01); *H04L 9/14* (2013.01); *H04L 9/3268* (2013.01); *H04L 67/12* (2013.01);
(Continued)

(58) Field of Classification Search
CPC ......... H04L 63/06; H04L 9/3268; H04L 9/14; H04L 67/18; H04L 67/12; H04L 2209/84;
(Continued)

(56) References Cited

U.S. PATENT DOCUMENTS

| | | | |
|---|---|---|---|
| 7,734,050 B2 * | 6/2010 | Tengler | H04L 9/3263 380/264 |
| 2007/0223702 A1 * | 9/2007 | Tengler | H04L 9/3263 380/270 |

(Continued)

OTHER PUBLICATIONS

Whyte, W. et al.; "A Security Credential Management System for V2V Communications"; Vehicular Networking Conference (VNC); Dec. 16-18, 2013; Boston.
(Continued)

*Primary Examiner* — J. Brant Murphy
(74) *Attorney, Agent, or Firm* — Brett J. Slaney; Blake, Cassels & Graydon LLP

(57) ABSTRACT

A system and method are provided for certificate selection in infrastructures such as those planned to be used for V2V messaging, wherein the vehicle (or other moving object)'s location is used to aid in the selection of certificates. In one aspect, there is provided a method of selecting certificates for vehicle-to-vehicle messaging, the method comprising: determining a location for a vehicle; and adapting reuse of certificates in a certificate pool for the vehicle according to the location. In another aspect, there is provided a method of selecting certificates for vehicle-to-vehicle messaging, the method comprising: determining an amount of messaging activity; and adapting reuse of certificates in a certificate pool for the vehicle according to the amount of messaging activity.

15 Claims, 7 Drawing Sheets

(52) U.S. Cl.
CPC ............. *H04L 67/18* (2013.01); *H04W 12/04* (2013.01); *G06F 2221/2111* (2013.01); *H04L 63/065* (2013.01); *H04L 63/0823* (2013.01); *H04L 2209/84* (2013.01); *H04W 4/046* (2013.01); *H04W 64/00* (2013.01); *H04W 84/005* (2013.01)

(58) Field of Classification Search
CPC .. H04L 63/065; H04L 63/0823; H04W 12/04; H04W 4/046; H04W 64/00; H04W 84/00; G06F 2221/2111
See application file for complete search history.

(56) References Cited

U.S. PATENT DOCUMENTS

| | | | | |
|---|---|---|---|---|
| 2008/0232595 | A1* | 9/2008 | Pietrowicz | G06Q 20/3829 380/277 |
| 2011/0191581 | A1* | 8/2011 | Shim | H04L 67/12 713/158 |
| 2012/0268258 | A1* | 10/2012 | Longobardi | H04L 9/3268 340/425.5 |
| 2014/0380056 | A1* | 12/2014 | Buckley | H04L 9/0847 713/171 |
| 2015/0270975 | A1* | 9/2015 | Buckley | H04L 63/126 713/156 |
| 2015/0288527 | A1* | 10/2015 | Vanstone | H04L 9/3268 713/156 |

OTHER PUBLICATIONS

Emara, K et al.; "CAPS: Context-Aware Privacy Scheme for VANET Safety Applications"; WiSec'15 Proceedings of the 8th ACM Conference on Security & Privacy in Wireless and Mobile Networks; Jun. 22-26, 2015, New York.

Lefevre, S. et al.; "Impact of V2X Privacy Strategies on Intersection Collision Avoidance Systems"; Vehicular Networking Conference (VNC); Dec. 16-18, 2013; Boston.

* cited by examiner

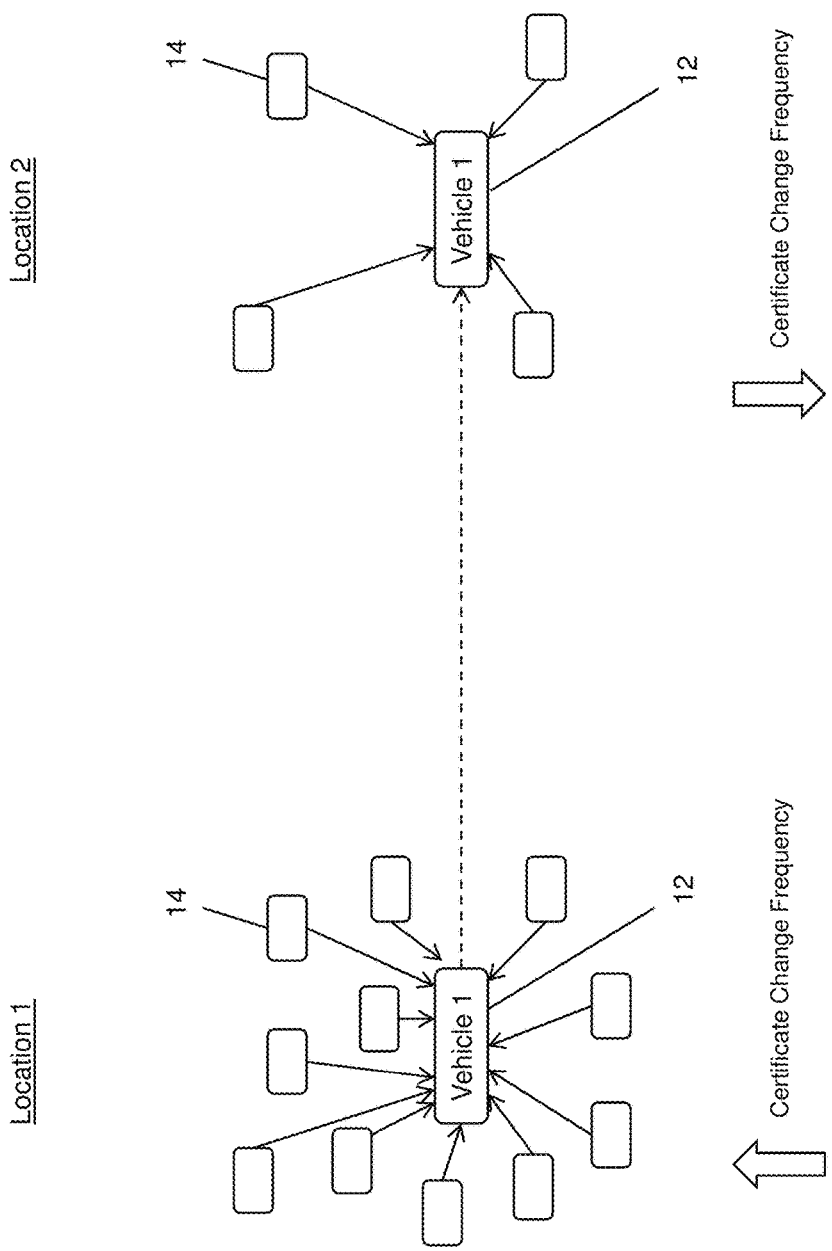

SYSTEM AND METHOD FOR CERTIFICATE SELECTION IN VEHICLE-TO-VEHICLE APPLICATIONS TO ENHANCE PRIVACY

CROSS-REFERENCE TO RELATED APPLICATION(S)

This application claims priority to U.S. Provisional Patent Application No. 62/288,010 filed on Jan. 28, 2016, the contents of which are incorporated herein by reference.

TECHNICAL FIELD

The following relates to systems and methods for enhancing privacy using certificate selection in vehicle-to-vehicle applications.

DESCRIPTION OF THE RELATED ART

Privacy is a significant concern for the proposed vehicle-to-vehicle (V2V) messaging infrastructure in the United States (e.g., see Whyte, William et al., "*A Security Credential Management System for V2V Communications*", *Vehicular Networking Conference (VNC), 2013 IEEE*, 16-18 Dec. 2013, p 1-8). Significant design effort has been invested in an attempt to prevent the V2V messaging infrastructure from being used to track and record the movement of individual vehicles and their owners. Despite this effort, the messaging infrastructure has been shown to be vulnerable to some types of sophisticated attacks (e.g., see Emara, Karim et al., "*CAPS: Context-Aware Privacy Scheme for VANET Safety Applications*", *WiSec '15 Proceedings of the 8th ACM Conference on Security & Privacy in Wireless and Mobile Networks*, Article No. 21, 2015).

The core privacy-enhancing feature of the Security Credential Management System (SCMS) proposed for implementing V2V messaging is the fact that each vehicle receives a large number of digital certificates, and the vehicle changes the certificate used to sign messages frequently. The currently recommended rate is to change certificates every five minutes. However, practical constraints on memory and certificate creation capacity make it impractical to dispose of each certificate after just one use. As such, the certificates will need to be recycled on that basis. It has also been proposed that a pool of certificates remain in use for one week or longer.

A threat to this approach arises from attackers, even unsophisticated ones, who can monitor transmissions from a vehicle from multiple locations over long period of time. If the attacker can correlate a large percentage of certificates to a single vehicle, that pool of known certificates can be used to discover, identify and track the same vehicle in new locations. Avoiding these attacks can be particularly challenging if the attacker places monitoring/tracking equipment in a region where a vehicle travels frequently. This can enable such attackers to observe the same vehicle many times, and therefore collect a large number of recycled certificates. It also presents a problem in rural areas, where the density of vehicles is low, making it easy to track individual vehicles and observe the regularly scheduled certificate changes. Moreover, the equipment required to perform such tracking is relatively inexpensive, which would enable an attacker to mount such attacks at a relatively low cost.

It is an object of the following to address at least one of the above concerns.

SUMMARY

The following provides a system and method for certificate selection in infrastructures such as those planned to be used for V2V messaging, wherein the vehicle (or other moving object)'s location is used to aid in the selection of certificates. For example, by re-using a smaller pool of certificates in locations where a vehicle travels most frequently, an attacker with equipment located in those locations can obtain only a small sample of certificates. By switching to different sets of certificates in other locations, the system can frustrate an attacker's attempt to correlate information across locations.

In one aspect, there is provided a method of selecting certificates for vehicle-to-vehicle messaging, the method comprising: determining a location for a vehicle; and adapting reuse of certificates in a certificate pool for the vehicle according to the location.

In one implementation, a sub-pool of certificates for that location is increased or decreased according to how frequently the vehicle is in that location. In another implementation, a frequency of reuse of the certificates is increased or decreased according to how frequently the vehicle is in that location. The method can further comprise adapting reuse of the certificates according to time.

In another aspect, there is provided a method of selecting certificates for vehicle-to-vehicle messaging, the method comprising: determining an amount of messaging activity; and adapting reuse of certificates in a certificate pool for the vehicle according to the amount of messaging activity.

In one implementation, a frequency of reuse of the certificates is increased or decreased according to how frequently the vehicle receives messages from other devices.

In other aspects, there are provided systems, electronic devices, and computer readable media configured for performing the above methods.

BRIEF DESCRIPTION OF THE DRAWINGS

Embodiments will now be described by way of example with reference to the appended drawings wherein:

FIG. 7 is a schematic diagram illustrating the adaptation of a sub-pool of certificates based on local BSM traffic.

DETAILED DESCRIPTION

Figure 1:
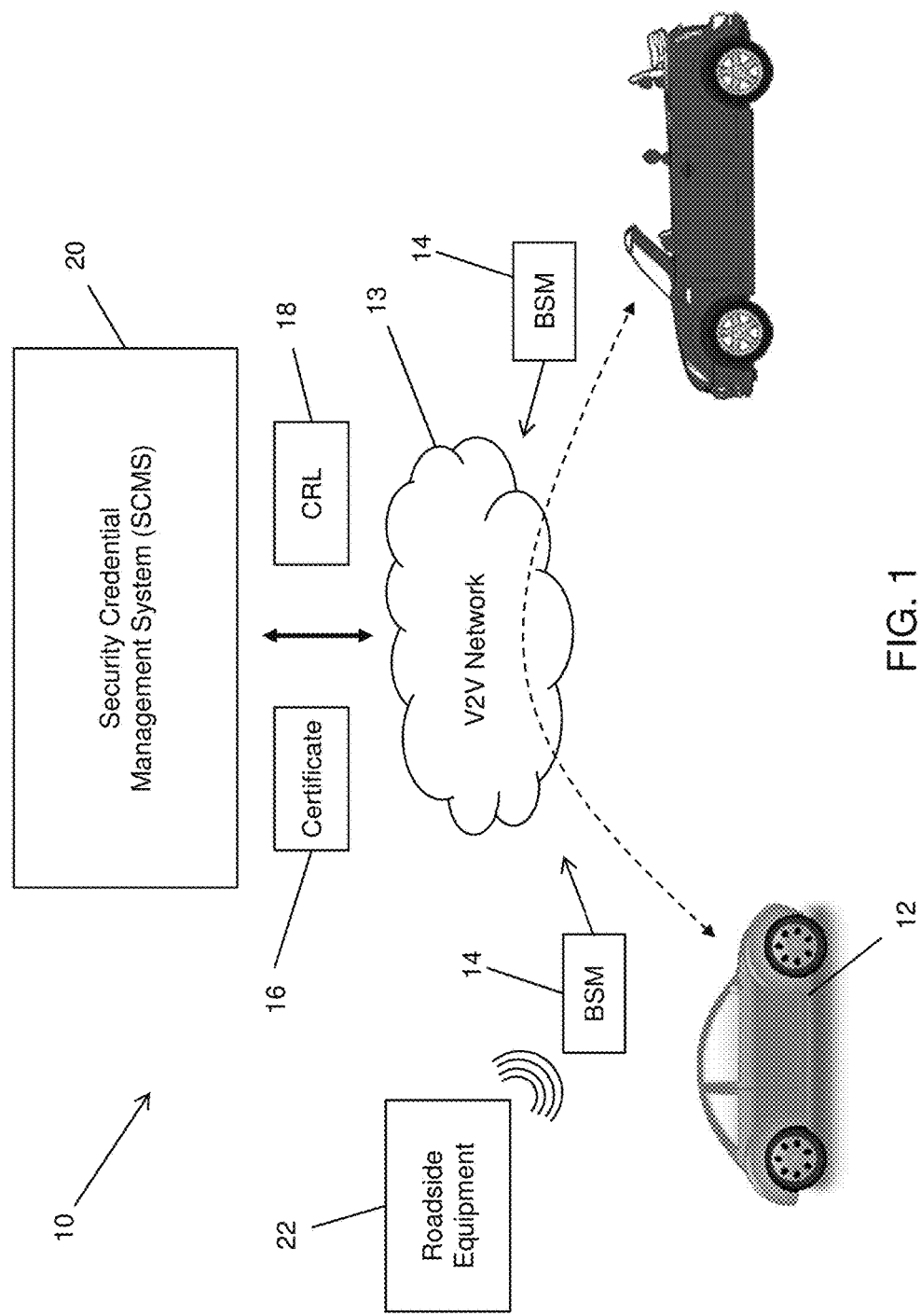
FIG. 1 is a schematic diagram of a V2V messaging system.

Turning now to the figures, FIG. 1 illustrates a V2V messaging system 10 (the system 10 hereinafter), which enables V2V messaging between vehicles 12. It can be appreciated that while the examples provided herein are directed to messaging between vehicles 12, the principles equally apply to any moving object or device, such as an aerial drone, watercraft, device-carrying human or animal, etc. The vehicles 12 can send and receive basic safety messages (BSMs) 14 over a V2V network 13, e.g., for performing crash prevention, driverless vehicle operation, etc. The V2V network 13 can include one or more wireless and/or wired communication media, including, for example, cellular and WiFi networks, short-range Bluetooth or NFC networks, landline telephone, fiber optic, coaxial cable, radio, satellite, data-over-power, etc. The V2V network 13 is also utilized to transmit certificates 16, certificate revocation lists 18 and otherwise communicate with a security credential management system (SCMS) 20. FIG. 1 also illustrates roadside equipment 22, for example stationary or movable tracking, monitoring, or broadcasting devices, which could be either legitimate devices or adversarial devices in the hands of an attacker or potential attacker.

To prevent an attacker from introducing false messages in the system 10, each BSM 14 is signed, and the receiving vehicles 12 verify the signature before processing the BSM 14 and its contents. The SCMS 20 operates as a public key infrastructure (PKI) to facilitate and manage digital certificates to build trust between participants in the system 10, and for proper functioning of the system 10. Besides its functionality as a PKI, the SCMS 20 can be designed to handle the following types of attacks: i) attacks on an end-user's privacy from those outside the SCMS 20, ii) attacks on an end-user's privacy from those inside the SCMS 20, and iii) authenticated messages leading to false warnings. The attacks on an end user's privacy can be addressed through "privacy by design", and the false warnings can be addressed through revocation mechanisms, e.g., by using misbehaviour detection and reporting to identify devices that should be revoked.

An important objective of the system 10 is to protect the privacy of end-users and, since most vehicles are primarily operated by a single user, the system 10 should make it difficult to track individual users. This means that different eavesdroppers in different locations should not be able to ascertain that different transmissions came from the same vehicle. As discussed above, this is addressed by implementing frequent certificate changes (e.g., every 5 minutes). The SCMS 20 can also be configured to divide operations among various components in order to make attacks more difficult to those inside the SCMS 20.

The SCMS 20 is configured to implement revocation by distributing the CRLs 18, which are used to reject certificates from misbehaving devices. The SCMS 20 can also maintain a "blacklist" to deny future certificate requests by revoked devices.

Figure 2:
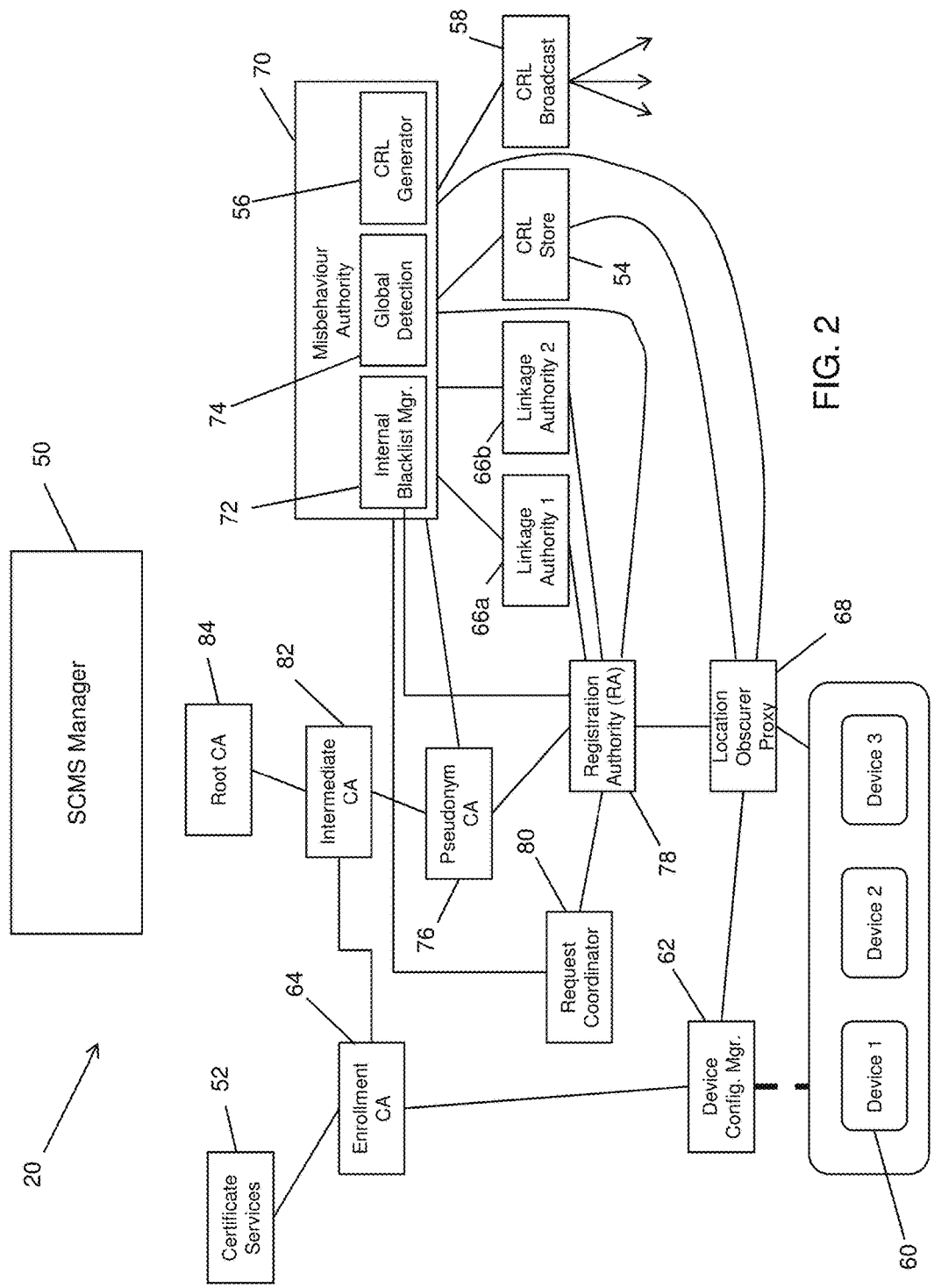
FIG. 2 is a schematic diagram of an SCMS.

FIG. 2 illustrates an example of a configuration for the SCMS 20 that has been contemplated for performing V2V messaging. The lines connecting components in FIG. 2 represent communication and/or connectivity between the components, e.g., for exchanging information, messages, certificates, etc. The bold dashed line in FIG. 2 represents an out-of-band secure communication.

The SCMS 20 includes an SCMS manager 50, which operates to ensure efficient and fair operation of the SCMS 20, and sets guidelines for reviewing misbehavior and revocation requests to ensure that they are correct according to procedures.

A certification services entity 52 provides information on which types of devices are certified to receive digital certificates 16, and specifies the certification process; and a CRL store 54 stores and distributes CRLs 18. The operation of the CRL store 54 can be implemented as a pass-through function since CRLs 18 are signed by a CRL Generator 56.

A CRL broadcast entity 58 broadcasts the current CRL 18, which can be done through roadside equipment 22 or a satellite radio or other wireless system. The CRL broadcast entity 58 can also be a pass-through function associated with the CRL generator 56. The devices 60 shown in FIG. 2 can be any end-entity device that sends BSMs 14, for example on-board equipment (OBE), an after-market safety device (ASD), or any communications-capable electronic device.

A device configuration manager 62 is connectable to the devices 60 using an out-of-band secure channel and is used to provide authenticated information about SCMS component configuration changes to the devices 60, which may include a component changing its network address or certificate, or relaying policy decisions issued by the SCMS manager 50. The device configuration manager 62 is also used to attest to an enrollment certification authority (CA) 64 that a device 60 is eligible to receive enrollment certificates. The enrollment CA 64 issues enrollment certificates, which act as a "passport" for the device 60, and can be used to request pseudonym certificates. Different enrollment CAs 64 may issue enrollment certificates for different geographic regions, manufacturers, or device types.

A linkage authority 66 is provided to generate linkage values, which are used in the certificates 16 and support efficient revocation. In the configuration shown in FIG. 2, there are two linkage authorities in the SCMS 20, identified as linkage authority 1 (66a) and linkage authority 2 (66b). Splitting the linkage authorities 66 in this way prevents the operator of a linkage authority 66a, 66b from linking certificates 16 belonging to a particular device 60. A location obscurer proxy 68 is provided to hide the location of the requesting device by changing source addresses, and thus inhibits linking of network addresses to particular locations. Additionally, when forwarding information to a misbehavior authority 70, the location obscurer proxy 68 can be used to shuffle reports to inhibit the misbehaviour authority 70 from determining the reporter's routes.

The misbehavior authority 70 processes misbehavior reports to identify potential misbehavior by devices 60, and if necessary, revokes and adds devices 60 to the CRL 18. The misbehaviour authority 70 can also be used to initiate the process of linking a certificate identifier to the corresponding enrollment certificates, and adding the enrollment certificate to an internal blacklist. For these purposes, the misbehaviour authority 70 includes an internal blacklist manager 72, which sends information required for updating the internal blacklist to a global detection entity 74, which determines which devices are misbehaving, and the CRL generator 56, which issues CRLs 18 to the outside world via a CRL broadcast 58.

A pseudonym CA 76 issues short-term (i.e. pseudonym) certificates 16 to devices 60. Individual pseudonym CAs 76 may, for example, be limited to a particular geographic region, a particular manufacturer, or a type of devices 60. A registration authority (RA) 78 is used to validate, process, and forward requests for pseudonym certificates 16 to the pseudonym CA 76. A request coordination entity 80 is also shown in FIG. 2, which is used to ensure that a device 60 does not request more than one set of certificates 16 for a given time period. The request coordination entity 80 coordinates activities between different RAs 78, and is only needed if a device 60 could request certificates from multiple RAs 78. Other components used in typical PKIs may also be part of the system configuration, for example an intermediate CA 82 and a root CA 84 as illustrated in FIG. 2.

The SCMS 20 is configured to implement a pseudonym certificate provisioning process that balances various competing objectives, such as: i) privacy versus size, versus connectivity; CRL size versus retrospective unlinkability; and certificate waste versus known attacks. With respect to considerations of privacy versus size, versus connectivity, certificates 16 should be used only for short periods of time for privacy; however, devices 60 may have difficulty storing a large number of certificates and may not have frequent enough connectivity to the SCMS 20 to enable certificates 16 to be downloaded on demand.

With respect to CRL size versus retrospective unlinkability, the SCMS 20 should be able to revoke misbehaving devices 60, however, putting all valid certificates 16 of a device 60 on the CRL 18 would tend to make the CRL 18 quite large. The SCMS 20 therefore uses a mechanism to revoke a large number of certificates 16 efficiently, without revealing certificates that were used by a device 60 before it began misbehaving.

With respect to certificate waste versus known attacks, since certificates 16 should be changed periodically for privacy, one option is to have a large number of certificates 16, each being valid one after the other for a short period of time. However, this would result in a large number of unused certificates. Another option is to have multiple certificates valid simultaneously for longer periods of time, as discussed herein wherein a "pool" of certificates is used for a particular period of time. While this may enable masquerading as multiple devices by compromising a single device (e.g., according to the so-called Sybil attack), frequent certificate changes for a relatively large pool of certificates is considered to offer a reasonable balance when implementing an SCMS 20. For example, the SCMS 20 can be configured to have multiple certificates be valid in a given time period, with the certificate validity period being days rather than minutes, and the certificate usage pattern can vary from device 60 to device 60, e.g. a device 60 could use a certificate 16 for 5 minutes after start-up, then switch to another certificate 16, and use that either for 5 minutes, or until the end of the journey.

Such a model offers enough flexibility to find a good balance among the considerations listed above. This model provides a reasonable level of privacy against tracking while keeping the storage requirements low due to a high utilization of certificates. A device that uses fewer than the number of certificates granted for a week would not be linked. Moreover, if a device 60 reuses certificates 16, that device 60 would be linkable only within a week.

Privacy-conscious users could potentially buy additional certificates 16 so long as their device 60 had the storage space and demonstrated that it had appropriate physical security against compromise. The model also allows for an easy topping-off mechanism (without losing any other benefits) of certificates 16 at a granularity level of certificate validity period within the life cycle of a larger batch. For example, if a device 60 comes to the dealer one year after loading the last certificate, the outdated certificates can be deleted, freeing up space to provide it with another year's worth of certificates.

Figure 3:
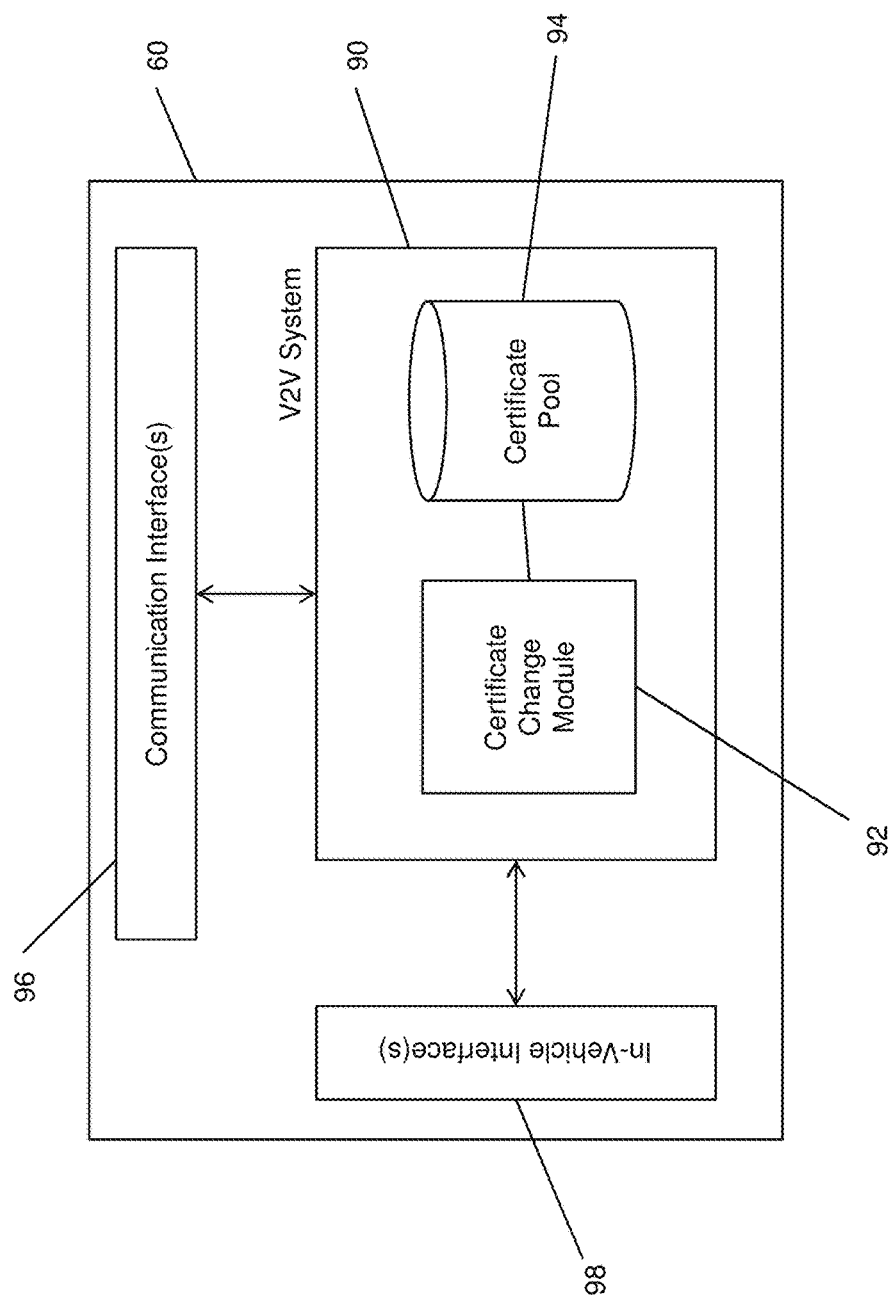
FIG. 3 is a block diagram of an example of a configuration for a participant device in a V2V messaging system.

FIG. 3 illustrates an example of a configuration for the device 60, that includes an ability to adapt the number of and/or frequency of reuse of the certificates 16 when signing BSMs 14. The device 60 in this example can be considered an on-vehicle device that is suitably configured to participate in V2V messaging within the system 10 and can communicate within the system 10 and store certificates 16 as discussed above. The device 60 includes a V2V system 90 that includes or otherwise has access to or operates with a certificate change module 92. The certificate change module 92 is used to adapt the way in which the certificates 16 are reused by the device 60 and thus the vehicle 12 in order to enhance privacy for the associated user. The certificate change module 92 includes or has access to a certificate pool 94, which is a data storage allocation for storing a certificates 16 that have been issued to that device 60, e.g., by the SCMS 20 described above.

The device 60 in this example also includes one or more communication interfaces 96 for accessing and being reachable via the V2V network 13 and/or any other suitable communication medium appropriate for the particular application. The device 60 also includes one or more in-vehicle interfaces 98 that enable the device 60 to interact with the vehicle 12, e.g., for participating in a V2V-based process such as crash avoidance, system or sensor monitoring, etc. It can be appreciated that the V2V system 90 can include or otherwise be embodied as a cryptographic processor or cryptographic module that is configured to perform cryptographic operations and can include or be embodied as a hardware security module (HSM) and/or include other aspects of security such as having secure memory for storing certificates 16, keys, etc. for participating in secure communications and to protect the BSMs 14.

In a first example, the certificates 16 used for securing the BSMs 14 at a particular time can be selected according to a geographic location. For example, a connected vehicle 12 travelling through a specific geographic area can select a specific certificate 16 to use while travelling through that area. The V2V system 90 or certificate change module 92 can maintain a mapping of geolocation to certificate 16 that is used as it travels in different locations. It can be appreciated that geolocation can be one of multiple parameters used to determine which certificate 16 is used.

Several certificates 16 can be mapped out to the same location to prevent overuse of certificates 16. This can be done, for example, using a hash-chain function, where the GPS coordinates are used as a key, and the chain of available certificates 16 mapping to that key correspond to the value. In this example, using a circular chain with a current certificate pointer, one can ensure more frequent reuse if the vehicle 12 remains in the same geographic area for long periods of time.

The determinant geolocation may not necessarily be precise, and a radius or area surrounding the GPS point can suffice. The algorithm used for certificate selection can be an adaptive correlation algorithm, that is, an algorithm wherein the more frequently the location is visited, the higher the correlation between that region and the certificates 16 selected. The pool of certificates 16 used in highly visited regions would therefore shrink in proportion to that correlation, in order to protect the vehicle 12 from divulging all of its certificates 16 in one geographic area. The adaptive correlation algorithm can account for the accuracy of the GPS coordinate source, according to a type of GPS receiver available in the device 60 and/or vehicle 12. For example, cellular-based GPS using cell-tower triangulation is less accurate than satellite-based GPS. Similarly, the GPS accuracy can vary depending on the number of satellites providing data. As such, the location radius can grow or shrink depending on conditions or the technology available (e.g., commercial versus military GPS). The adaptive correlation algorithm is thus able to adaptively shrink the pool of certificates as the GPS accuracy increases.

The adaptive correlation algorithm can also consider both location and time, as a three dimensional property (x, y, z), with (x, y) being the GPS coordinates and z being time. In this way, if a vehicle 12 visits the same (x, y) location at roughly the same time each day (i.e. at a consistent z), then there would be a high correlation for that three dimensional point.

Figures 4, 5:
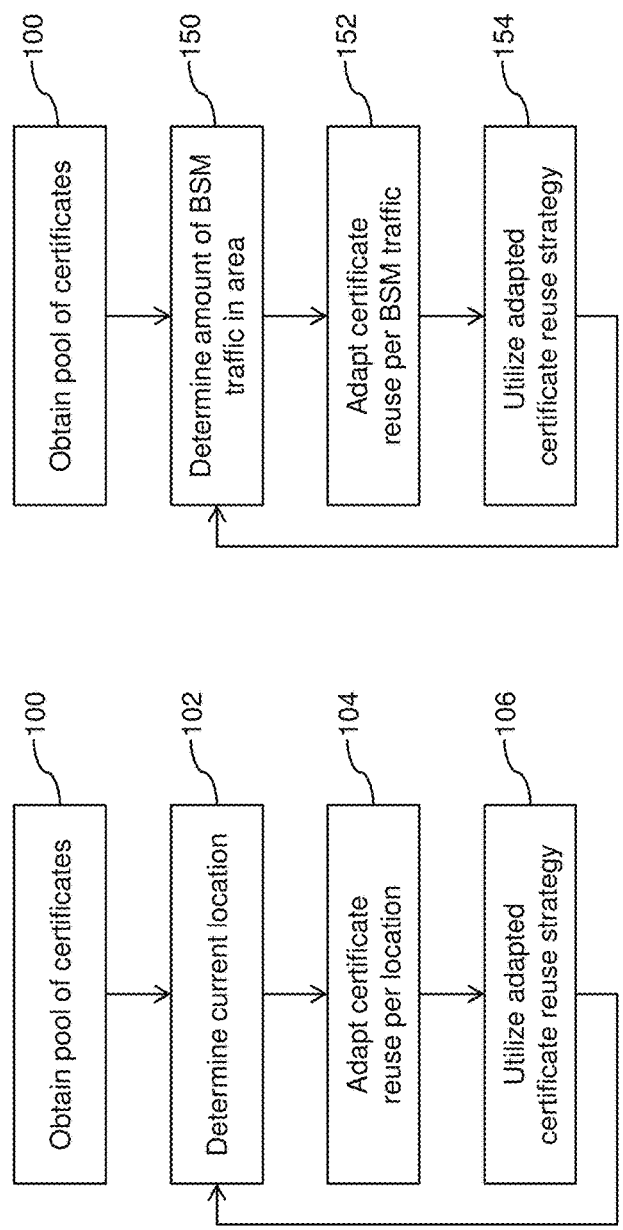
FIG. 4 is a flow chart illustrating computer executable operations performed by a participant device in adapting a frequency of certificate reuse according to location.
FIG. 5 is a flow chart illustrating computer executable operations performed by a participant device in adapting a frequency of certificate reuse according to local basic security message (BSM) traffic.
Figure 6A:
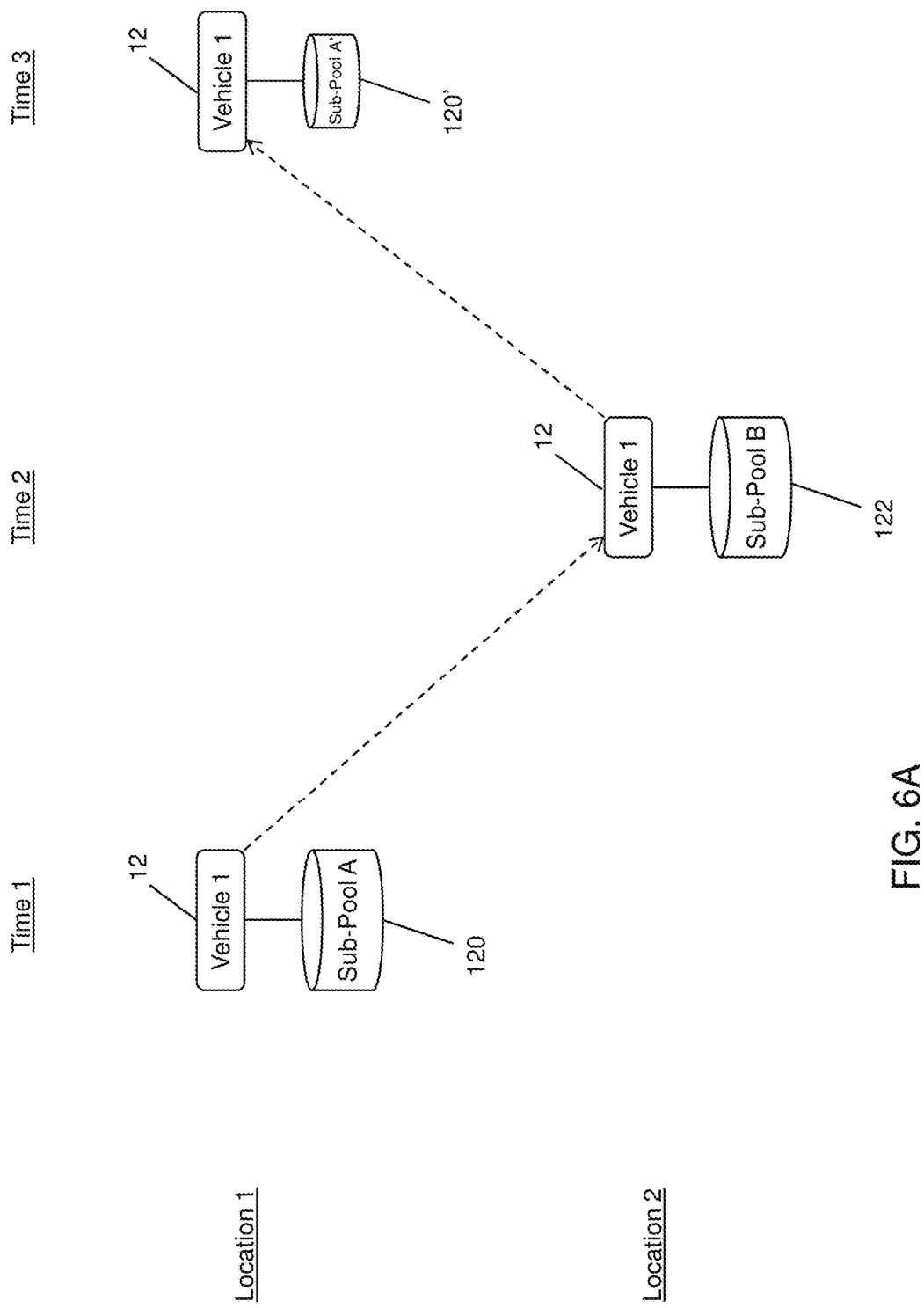
FIG. 6A is a schematic diagram illustrating the adaptation of a sub-pool of certificates based on location.

FIG. 4 illustrates a flow chart for selecting certificates 16 according to, at least in part, the location of the vehicle. At step 100, the V2V system 90 obtains a pool of certificates to be stored, e.g., by interacting with the SCMS 20. When the vehicle 12 is being operated, the certificate change module 92 determines the current geolocation at step 102, e.g. by obtaining data from a GPS receiver in the vehicle 12 or via a device in the vehicle that is communicable with the certificate change module 92. The certificate change module 92 can use a stored mapping or other available information to determine if the selection of the certificates currently being used (i.e. the "sub-pool") should be adapted. For example, if the vehicle 12 has entered a frequently visited location, the sub-pool selected for that location may be smaller than one used in a previous location. The certificate reuse for that location is then adapted at step 104 and the certificate reuse strategy utilized at step 106. For example, as shown in FIG. 6A, Vehicle 1 in Location 1 may use certificate Sub-pool A 120 and when moving to Location 2, use certificate Sub-pool B 122, with a different set of certificates 16 to confuse any potential tracking adversary. However, when returning to Location 1, particularly if this occurs frequently, Vehicle 1 may shrink the sub-pool of certificates used, Sub-Pool A' 120' in this example. It can be appreciated that while in this example Sub-Pool A shrunk according to the frequency of visits to Location 1, Sub-pool A could also (or in addition) be adapted to change the frequency of reuse, with the same sized Sub-pool A.

Figure 6B:
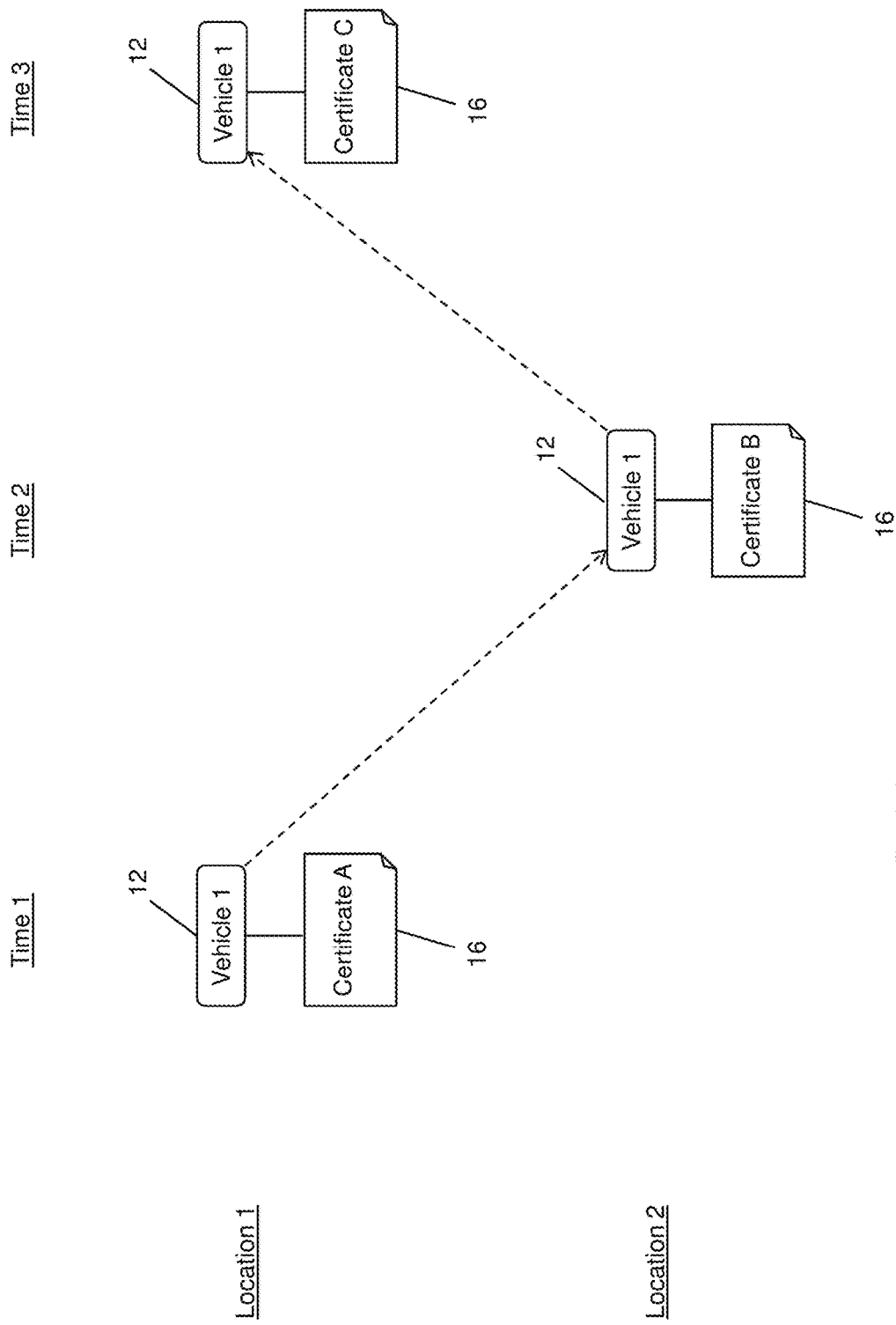
FIG. 6B is a schematic diagram illustrating specific certificate selection from the certificate pool based on location.

As noted above, the certificate selection criteria used can include other parameters, such as time. For example, a connected vehicle 12 travelling in a specific area at a particular time of the day, can select a specific certificate 16 from a sub-pool of certificates for that area, to use while travelling through that area at that time. It can be appreciated that the specific certificate 16 can also be pulled from the larger certificate pool 94 as shown in FIG. 6B (i.e., where different certificates (A and C) are selected for the more frequently visited Location 1).

Different sub-pools for the same location can also be used, which vary based on time. For example, a commuter could use one sub-pool of certificates during the morning drive to work and another sub-pool of certificates during the evening drive home. This addresses a potential vulnerability for drivers with routine routes that would otherwise enable an attacker to be alerted when they enter or leave the routine area. By considering both time and location, the certificate change module 92 can make a decision based on other factors as to whether to re-use the same certificate (or sub-pool of certificates) as previously, or a different certificate (or sub-pool of certificates). The connected vehicle 12 can maintain a mapping of geolocation and time, to certificate 16 used, as it travels. It can be appreciated that a combination of geolocation and time can be two of several parameters used to determine which certificate 16 is used at any given time.

The sub-pools of certificates can also be chosen based on time, to thus have different pools of certificates for specific time intervals. For example, each hour the certificate change module 92 can be configured to switch to a set of new sub-pools for the different geographic areas. When travelling into a frequent region of travel, the certificate change module 92 would then select the sub-pool associated with that geolocation at that time. If the geolocation is not one that is frequently visited, a new sub-pool can be chosen and associated with that geolocation. While in this configuration potentially more certificates would be divulged in the same region over a longer period of time, at the end of the overall certificate pool refresh period (e.g., on a weekly basis), all of the sub-pools would be refreshed with new certificates.

It has also been recognized that a connected vehicle 12 may travel through areas of varying traffic and activity, e.g., very rural versus very urban areas. This means that the privacy of the vehicle can be compromised more easily or more difficultly depending on how many vehicles 12 are in the same area when tracking or listening equipment 22 is present in that area. As shown in FIG. 5, the certificate change module 92 can also be configured to, at step 150, determine an amount of BSM traffic in the area near the vehicle 12 (e.g., within the range of detectability), which would roughly indicate the amount of traffic around the vehicle 12. The amount of BSM traffic can then be used at step 152 to adapt the certificate reuse according to the BSM traffic.

For example, a problem that can arise is that on a long drive through rural roads with very few other vehicles 12 on the road, a vehicle 12 risks divulging all of its certificates 16 for a particular period of time, to roadside equipment 22 used for listening. This can occur if the certificate change module 92 changes the certificates 16 used to sign the BSMs 14 and which are sent with the BSMs 14, on fixed time period, and a tracking system is able to match the certificates 16 to the vehicle 12. The certificates 16 can be matched by the attacker matching the digital signature or some other portion of data (e.g., a sub-string from the digital signature) and using this data as a unique ID. At a later time, the tracking system can use its knowledge of the certificates 16 to track the vehicle 12 in urban centers.

Since connected vehicles 12 have the ability to listen to BSMs 14 of other vehicles 12 or road side equipment 22 around them; depending on how frequently the vehicle 12 receives BSMs 14, the certificate reuse module 92 can control how often it changes certificates 16. In cases where the frequency is low, the certificate change module 92 can change certificates 16 at longer intervals to maintain secrecy of its certificate pool 94. At high a frequency of BSMs 14, the certificate change module 92 can switch to a default or fixed rate mandated by policy, or more frequently. Also, in this implementation, a sub-pool of certificates can be chosen from the certificate pool 94 to ensure that not all available certificates are used, even with a lower frequency of BSM traffic.

FIG. 7 illustrates higher BSM traffic in Location 1 versus Location 2, which causes the frequency of certificate changes to be adapted such that at a higher frequency of BSMs 14, a higher frequency of certificate change occurs when compared to areas of lower BSM 14 activity.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of selecting certificates for vehicle-to-vehicle messaging, the method comprising:
   determining a location for a vehicle; and
   adapting reuse of certificates in a certificate pool for the vehicle according to the location by increasing or decreasing a sub-pool of certificates for the location or increasing or decreasing a frequency of reuse of the certificates, according to how frequently the vehicle is in the location.

2. The method of claim 1, further comprising adapting reuse of the certificates according to time.

3. The method of claim 1, further comprising receiving data comprising the certificate pool.

4. The method of claim 3, wherein the data is received from a security credential management system.

5. The method of claim 1, further comprising using a particular certificate from the certificate pool in preparing a security message, and sending the security message.

6. The method of claim 1, further comprising selecting a sub-pool of certificates according to the location.

7. The method of claim 1, wherein a specific certificate is selected according to the location.

8. The method of claim 7, wherein the specific certificate changes for the location according to time.

9. A non-transitory computer readable medium comprising computer executable instructions for selecting certificates for vehicle-to-vehicle messaging, the instructions comprising instructions for:
   determining a location for a vehicle; and
   adapting reuse of certificates in a certificate pool for the vehicle according to the location by increasing or decreasing a sub-pool of certificates for the location or increasing or decreasing a frequency of reuse of the certificates, according to how frequently the vehicle is in the location.

10. The non-transitory computer readable medium of claim 9, further comprising instructions for adapting reuse of the certificates according to time.

11. The non-transitory computer readable medium of claim 9, further comprising instructions for receiving data comprising the certificate pool.

12. The non-transitory computer readable medium of claim 9, further comprising instructions for using a particular certificate from the certificate pool in preparing a security message, and sending the security message.

13. A device located in or on a vehicle for selecting certificates for vehicle-to-vehicle messaging, the device comprising a processor, at least one memory, and at least one communication interface, the memory storing computer executable instructions for determining a location for a vehicle; and adapting reuse of certificates in a certificate pool for the vehicle according to the location by increasing or decreasing a sub-pool of certificates for the location or increasing or decreasing a frequency of reuse of the certificates, according to how frequently the vehicle is in the location.

14. A method of selecting certificates for vehicle-to-vehicle messaging, the method comprising:
   determining an amount of messaging activity; and
   adapting reuse of certificates in a certificate pool for a vehicle according to the amount of messaging activity by increasing or decreasing a frequency of reuse of the certificates according to how frequently the vehicle receives messages from other devices.

15. The method of claim 14, further comprising using a particular certificate from the certificate pool for preparing a security message, and sending the security message.

* * * * *